United States Patent
Noh et al.

(10) Patent No.: US 10,263,681 B2
(45) Date of Patent: Apr. 16, 2019

(54) METHOD AND APPARATUS FOR REPORTING PERIODIC CHANNEL STATE INFORMATION IN MOBILE COMMUNICATION SYSTEM USING MASSIVE ARRAY ANTENNAS

(71) Applicant: Samsung Electronics Co., Ltd., Suwon-si, Gyeonggi-do (KR)

(72) Inventors: Hoondong Noh, Suwon-si (KR); Eko Onggosanusi, Mountain View, CA (US); Youngwoo Kwak, Suwon-si (KR); Younsun Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/720,875

(22) Filed: Sep. 29, 2017

(65) Prior Publication Data

US 2018/0102822 A1    Apr. 12, 2018

Related U.S. Application Data

(60) Provisional application No. 62/408,315, filed on Oct. 14, 2016, provisional application No. 62/406,232, filed on Oct. 10, 2016.

(51) Int. Cl.
| | |
|---|---|
| *H04B 7/06* | (2006.01) |
| *H04B 7/0417* | (2017.01) |
| *H04L 1/00* | (2006.01) |
| *H04W 24/10* | (2009.01) |
| *H04W 72/08* | (2009.01) |
| *H04B 7/0456* | (2017.01) |
| *H04L 5/00* | (2006.01) |

(52) U.S. Cl.
CPC ......... *H04B 7/0626* (2013.01); *H04B 7/0417* (2013.01); *H04B 7/0456* (2013.01);
(Continued)

(58) Field of Classification Search
CPC .. H04B 7/0417; H04B 7/0456; H04B 7/0626; H04B 7/063; H04B 7/0632;
(Continued)

(56) References Cited

U.S. PATENT DOCUMENTS 9,119,101 B2 *  8/2015  Liu ........................ H04W 24/10
9,729,273 B2 *  8/2017  Khoshnevis .......... H04L 5/0057
(Continued)

FOREIGN PATENT DOCUMENTS

WO    2017/086753 A1    5/2017

OTHER PUBLICATIONS

Ericsson, "Hybrid CSI Reporting with One and Two CSI Processes", 3GPP TSG-RAN WG1#85, R1-165098, May 14, 2016.
(Continued)

*Primary Examiner* — Ahmed Elallam
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure proposes a method and an apparatus for determining channel state information (CSI) to be reported according to a plurality of channel state reporting priority if periodic channel state information reporting collide with each other, and reporting the channel state information.

18 Claims, 13 Drawing Sheets

(52) U.S. Cl.
CPC ........... *H04B 7/063* (2013.01); *H04B 7/0632* (2013.01); *H04B 7/0636* (2013.01); *H04B 7/0639* (2013.01); *H04L 1/0026* (2013.01); *H04L 5/0053* (2013.01); *H04L 5/0064* (2013.01); *H04W 24/10* (2013.01); *H04W 72/085* (2013.01); *H04L 5/0062* (2013.01)

(58) Field of Classification Search
CPC .... H04B 7/0636; H04B 17/309; H04B 7/024; H04B 7/0413; H04B 7/0478; H04B 7/0639; H04B 7/0643; H04B 7/0689; H04L 1/0026; H04L 5/00; H04W 24/10; H04W 72/085; H04W 72/1242; H04W 8/22

See application file for complete search history.

(56) References Cited

U.S. PATENT DOCUMENTS

| | | | | |
|---|---|---|---|---|
| 9,807,763 | B2* | 10/2017 | Song | H04L 1/0026 |
| 10,020,860 | B2* | 7/2018 | Onggosanusi | H04B 7/0478 |
| 10,033,507 | B2* | 7/2018 | Yum | H04B 7/04 |
| 10,110,290 | B2* | 10/2018 | Kim | H04B 7/0626 |
| 10,129,906 | B2* | 11/2018 | Rahman | H04B 7/0626 |
| 2015/0215090 | A1 | 7/2015 | Sayana et al. | |
| 2015/0237521 | A1 | 8/2015 | Davydov et al. | |
| 2016/0156401 | A1 | 6/2016 | Onggosanusi et al. | |
| 2016/0269084 | A1* | 9/2016 | Nam | H04B 7/0417 |
| 2017/0244533 | A1* | 8/2017 | Onggosanusi | H04B 7/0478 |
| 2018/0034612 | A1* | 2/2018 | Lin | H04L 5/0048 |
| 2018/0049137 | A1* | 2/2018 | Li | H04B 17/309 |
| 2018/0115357 | A1* | 4/2018 | Park | H04B 7/04 |
| 2018/0123654 | A1* | 5/2018 | Park | H04B 7/04 |
| 2018/0175983 | A1* | 6/2018 | Yum | H04L 1/00 |
| 2018/0212660 | A1* | 7/2018 | Gao | H04B 7/0634 |
| 2018/0241453 | A1* | 8/2018 | Lee | H04L 1/06 |

OTHER PUBLICATIONS

Qualcomm Inc., "Discussion on CSI Reporting for Hybrid CSI-RS", 3GPP TSG-RAN WG1#86bis, Oct. 1, 2016.
International Search Report dated Jan. 17, 2018, issued in International Patent Application No. PCT/KR2017/011072.

* cited by examiner

METHOD AND APPARATUS FOR REPORTING PERIODIC CHANNEL STATE INFORMATION IN MOBILE COMMUNICATION SYSTEM USING MASSIVE ARRAY ANTENNAS

CROSS-REFERENCE TO RELATED APPLICATION(S)

This application claims the benefit under 35 U.S.C. § 119(e) of U.S. Provisional application filed on Oct. 10, 2016 in the U.S. Patent and Trademark Office and assigned Ser. No. 62/406,232, and U.S. Provisional application filed on Oct. 14, 2016 in the U.S. Patent and Trademark Office and assigned Ser. No. 62/408,315, the entire disclosure of each of which are hereby incorporated by reference.

TECHNICAL FIELD

The present disclosure relates to a wireless mobile communication system. More particularly, the present disclosure relates to a method and an apparatus in which the terminal measures a wireless channel state based on a plurality of reference signals, generates channel state information (CSI) according thereto, and reports the generated CSI to a base station (BS) in a wireless mobile communication system.

BACKGROUND

To meet the demand for wireless data traffic having increased since deployment of 4th-generation (4G) communication systems, efforts have been made to develop an improved 5th-generation (5G) or pre-5G communication system. Therefore, the 5G or pre-5G communication system is also called a 'Beyond 4G Network' or a 'Post long-term evolution (LTE) System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency-shift keying (FSK) and quadrature amplitude modulation (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described Big Data processing technology may also be considered to be as an example of convergence between the 5G technology and the IoT technology.

In accordance with development of the MIMO technology, a study on the FD-MIMO using multiple antennas has been actively conducted, and in the LTEC system release 13, a non-precoded channel state information (CSI) reference signal (CSI-RS) and a beamformed CSI-RS have been introduced. Further, the terminal may report CSI measured through the CSI-RS periodically or aperiodically.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the abovementioned problems and/or disadvantages and to provide at least the advantages described below. Accordingly, an aspect of the present disclosure is to provide a method for priority rules is suggested. Specifically, an aspect of the present disclosure proposes a method for priority rules of periodic channel state information (CSI) reporting based on a beamformed CSI reference signal (CSI-RS).

In accordance with an aspect of the present disclosure, a method of a terminal in a wireless communication system is provided. The method includes receiving feedback configuration information on a periodic CSI reporting of at least one CSI process, identifying whether at least two CSI reportings are overlapped based on the feedback configuration information, identifying a CSI reporting to be reported to a base station (BS) based on a priority, based on whether the at least two CSI reportings are overlapped, and transmitting CSI of the identified CSI reporting to the BS, in which a first type and a second type of a CSI process is configured on one or more of the at least one CSI process.

The priority may include at least one of a priority on CSI reporting, a priority on a CSI process identifier (ID), or a priority on an order of type of a CSI process.

The identifying the CSI reporting may include identifying whether the at least two CSI reportings are associated with a same CSI process, and determining that a CSI reporting of the first type is the CSI reporting to be reported, based on whether the at least two CSI reportings are associated with the same CSI process.

The identifying the CSI reporting may include identifying whether the at least two CSI reportings correspond to a same reporting type, based on whether the at least two CSI reportings are not associated with the same CSI process, determining a CSI reporting to be reported based on a priority on CSI reporting, based on whether the at least two CSI reportings do not correspond the same reporting type, and determining a CSI reporting to be reported based on a CSI process ID, based on whether the at least two CSI reportings correspond the same reporting type.

The identifying the CSI reporting may include identifying whether the at least two CSI reportings correspond to a same reporting type, determining a CSI reporting to be reported based on a priority on CSI reporting, based on whether the at least two CSI reportings do not correspond the same reporting type, determining whether the at least two CSI reportings are associated with a same CSI process, based on whether the at least two CSI reportings correspond the same reporting type, and determining a CSI reporting to be reported based on a CSI process ID, based on whether the at least two CSI reportings are not associated with the same CSI process.

The identifying the CSI reporting may include determining that a CSI reporting of the first type is the CSI reporting to be reported, based on whether the at least two CSI reportings are associated with the same CSI process.

The method may further include generating the CSI by combining CSI for the CSI reporting of the first type and CSI for a CSI reporting of the second type.

In accordance with another aspect of the present disclosure, a method of a BS in a wireless communication system, the method includes transmitting feedback configuration information on a periodic CSI reporting of at least one CSI process, identifying whether at least two CSI reportings are overlapped based on the feedback configuration information, identifying a CSI reporting to be reported to a BS based on a priority, based on whether the at least two CSI reportings are overlapped, and receiving CSI of the identified CSI reporting to the BS, and wherein a first type and a second type of a CSI process is configured on one or more of the at least one CSI process.

The priority may include at least one of a priority on CSI reporting, a priority on a CSI process ID, or a priority on an order of type of a CSI process.

In accordance with another aspect of the present disclosure, a terminal in a wireless communication system is provided. The terminal includes a transceiver, and a controller coupled with the transceiver and configured to control to receive feedback configuration information on a periodic CSI reporting of at least one CSI process, identify whether at least two CSI reportings are overlapped based on the feedback configuration information, identify a CSI reporting to be reported to a BS based on a priority, and transmit CSI of the identified CSI reporting to the BS, in which a first type and a second type of a CSI process is configured on one or more of the at least one CSI process.

The priority may include at least one of a priority on CSI reporting, a priority on a CSI process ID, or a priority on an order of type of a CSI process.

The controller may be configured to control to identify whether the at least two CSI reportings are associated with a same CSI process, and determine that a CSI reporting of the first type is the CSI reporting to be reported, based on whether the at least two CSI reportings are associated with the same CSI process.

The controller may be configured to control to identify whether the at least two CSI reportings correspond to a same reporting type, if the at least two CSI reportings are not associated with the same CSI process, determine a CSI reporting to be reported based on a priority on CSI reporting, if the at least two CSI reportings do not correspond the same reporting type, and determine a CSI reporting to be reported based on a CSI process ID, based on whether the at least two CSI reporting correspond the same reporting type.

The controller may be configured to control to identify whether the at least two CSI reportings correspond to a same reporting type, determine a CSI reporting to be reported based on a priority on CSI reporting, based on whether the at least two CSI reportings do not correspond the same reporting type, determine whether the at least two CSI reportings are associated with a same CSI process, based on whether the at least two CSI reportings correspond the same reporting type, and determine a CSI reporting to be reported based on a CSI process ID, based on whether the at least two CSI reportings are not associated with the same CSI process.

The controller may be configured to control to determine that a CSI reporting of the first type is the CSI reporting to be reported, based on whether the at least two CSI reportings are associated with the same CSI process.

The controller may be further configured to generate the CSI by combining CSI for the CSI reporting of the first type and CSI for a CSI reporting of the second type.

In accordance with another aspect of the present disclosure, a BS in a wireless communication system is provided. The BS includes a transceiver, and a controller coupled with the transceiver and configured to control to transmit feedback configuration information on a periodic CSI reporting of at least one CSI process, identify whether at least two CSI reportings are overlapped based on the feedback configuration information, identify a CSI reporting to be reported to a BS based on a priority, based on whether the at least two CSI reportings are overlapped, and receive CSI of the identified CSI reporting to the BS, in which a first type and a second type of a CSI process is configured on one or more of the at least one CSI process.

The priority may include at least one of a priority on CSI reporting, a priority on a CSI process ID, or a priority on an order of type of a CSI process.

According to the various embodiments of the present disclosure, the method for priority rules of channel state reporting between reference signals in the BS including a plurality of antennas and the terminal is defined, thereby minimizing loss of system throughput in a situation in which multiple channel state reporting collide with each other.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
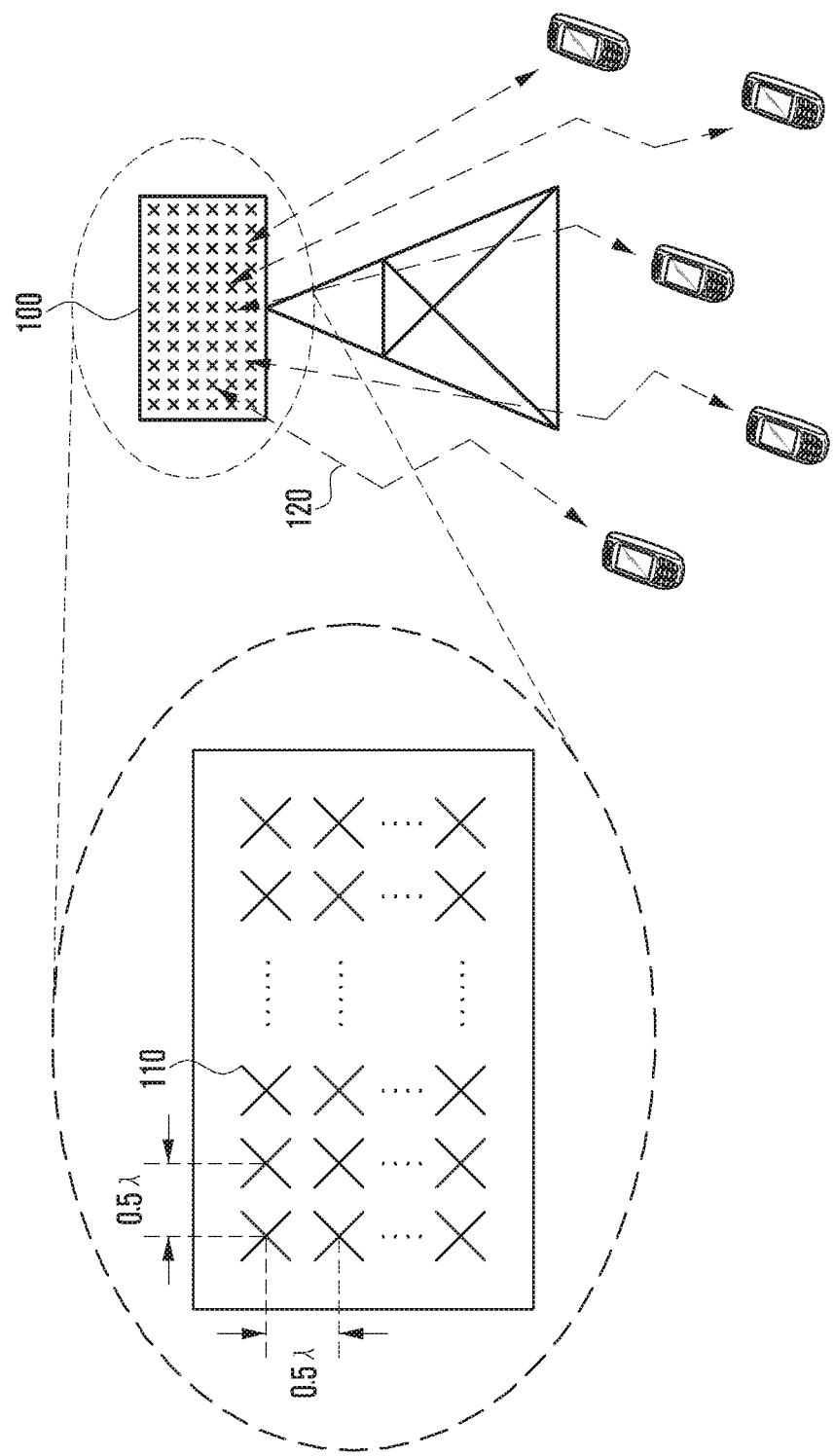
FIG. 1 is a diagram illustrating a full dimensional multiple-input multiple-output (FD-MIMO) system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, an operation principle for preferred various embodiments of the present disclosure will be described in detail with reference to the accompanying drawings. Throughout the drawings, like reference numerals are used to depict the same elements, and when it is determined that the detailed description of relevant known function or configuration may obscure the gist of the present disclosure, the detailed description thereof will be omitted. Further, the following terminologies are defined in consideration of the functions in the present disclosure and may be construed in different ways by the intention of users and operators, customary practice, or the like. Therefore, the definitions thereof should be construed based on the contents throughout the specification.

Since the present disclosure may be variously modified and have several embodiments, specific embodiments will be shown in the accompanying drawings and be described in detail. However, it is to be understood that the present disclosure is not limited to the specific embodiments, but includes all modifications, equivalents, and substitutions included in the spirit and the scope of the present disclosure.

Further, terms including an ordinal number such as 'first', 'second', and the like can be used to describe various elements, but the elements are not to be construed as being limited to the terms. The terms are used to distinguish one component from another component. For example, the 'first' component may be named the 'second' component without being departed from the scope of the present disclosure and the 'second' component may also be similarly named the 'first' component. A term 'and/or' includes a combination of a plurality of related described items or any one of the plurality of related described items.

Terms used in the present specification are used only in order to describe specific embodiments rather than limiting the present disclosure. It will be further understood that the terms "comprises" or "have" used in this specification, specify the presence of stated features, operations, components, parts, or a combination thereof, but do not preclude the presence or addition of one or more other features, numerals, operations, components, parts, or a combination thereof.

Hereinafter, a base station (BS) according to another embodiment of the present disclosure may be at least one of an evolved node (eNode) B, a Node B, a BS, a radio access unit, a BS controller, and a node on a network, as a subject performing resource allocation of a terminal. Hereinafter, a terminal according to an embodiment of the present disclosure may include user equipment (UE), a mobile station (MS), a cellular phone, a smartphone, a computer, a multimedia system capable of performing a communication function, a small sensor including a communication function, a wearable device, Internet of Things device, Hereinafter, in various embodiments of the present disclosure, a downlink (DL) means a wireless transmission path of a signal transmitted by the BS to the terminal, and an uplink (UL) means a wireless transmission path of a signal transmitted by the terminal to the BS. Further, hereinafter, various embodiments of the present disclosure will be described with the LTE or LTE-A system by way of example, but the various embodiments of the present disclosure may also be applied to other communication systems having similar technical background or channel type such as LTE-A Pro, new radio (NR), and the like. Further, the various embodiments of the present disclosure may also be applied to other communication systems through some modification without departing from the scope of the present disclosure based on determination by a person skilled in the art.

Hereinafter, all embodiments of the present disclosure are not exclusive and one or more embodiments may be complexly performed, but for convenience of explanation, the various embodiments will be divided into an individual an embodiment and examples.

First Embodiment

The present disclosure relates to a general wireless mobile communication system. More particularly, the present disclosure relates to a method for transmitting and receiving precoder matrix indicator (PMI) and channel state information (CSI) in which a terminal measures channel quality (wireless channel state) and notifies the measured channel quality to a BS in order to be operated according to a hybrid multiple input multiple output (MIMO) system in a wireless mobile communication system to which a multiple access scheme using multi-carrier such as orthogonal frequency division multiple access (OFDMA) is applied.

Current mobile communication system has been developed as a high-speed and high-quality wireless packet data communication system to provide a data service and a multimedia service in addition to provision of early voice-oriented service. To this end, various standardization organizations such as $3^{rd}$ generation partnership project (3GPP), 3GPP2, and institute of electrical and electronics engineers (IEEE) perform standardization on a $3^{rd}$ generation evolution mobile communication system to which a multiple access scheme using multi-carrier is applied. Recently, various mobile communication standards such as long-term evolution (LTE) of 3GPP, ultra-mobile broadband (UMB) of 3GPP2, and 802.16m of IEEE have been developed to support a high-speed and high quality wireless packet data transmission service based on the multiple access scheme using the multi-carrier.

The existing $3^{rd}$ generation evolution mobile communication system such as LTE, UMB, and 802.16m is based on the multi-carrier multiple access scheme and uses various technologies such as MIMO, multiple antenna, beam-forming, adaptive modulation and coding (AMC), and channel sensitive scheduling in order to improve transmission efficiency. The various technologies described above improve transmission efficiency through a method of concentrating transmission power transmitted from various antennas or adjusting an amount of transmitted data depending on channel quality or the like, selectively transmitting data to a user with good channel quality, and the like, thereby improving system throughput performance. Most of these methods are operated based on CSI between a BS (eNB: evolved Node B, BS: BS) and a terminal (UE, MS), thus eNB or UE needs to check the channel state between the BS and the terminal. In this case, a channel state indication reference signal or CSI reference signal (CSI-RS) is used. The above mentioned eNB means a DL transmission and UL reception apparatus positioned at a predetermined place, and one eNB may perform transmission and reception with respect to a plurality of cells. In one mobile communication system, a plurality of eNBs are geographically distributed and each eNB performs transmission and reception with respect to the plurality of cells.

The current $3^{rd}$ and $4^{th}$ generation mobile communication systems such as LTE and LTE-advanced (LTE-A) utilize the MIMO technology that performs transmission using a plurality of transmission and reception antennas in order to increase data transmission rate and system capacity. The MIMO technology spatially separates and transmits a plurality of information streams by using the plurality of transmission and reception antennas. Spatially separating and transmitting the plurality of information streams as described above is called spatial multiplexing. Generally, the number of information streams to which the spatial multiplexing may be applied is changed depending on the number of antennas of a transmitter and a receiver. Generally, the number of information streams that the spatial multiplexing may be applied is defined as rank of corresponding transmission. The MIMO technology supported by LTE/LTE-A release 11 standard supports the spatial multiplexing for a case in which the number of transmission and reception antennas is 8, respectively, and the rank up to 8 is supported. Meanwhile, the FD-MIMO system to which the technology proposed in the present disclosure is applied corresponds to a case of using 32 or more transmission antennas that are more than 8 antennas in accordance with evolution of the existing LTE/LTE-A MIMO technology.

The FD-MIMO system refers to a wireless communication system that transmits data using tens or more of transmission antennas.

FIG. 1 is a diagram illustrating an FD-MIMO system according to an embodiment of the present disclosure.

Referring to FIG. 1, a BS transmission apparatus 100 transmits a wireless signal using the tens or more of transmission antennas. The plurality of transmission antennas is disposed to maintain a minimum distance therebetween as 110. As an example, the minimum distance may be a half of a wavelength of the transmitted wireless signal. Generally, when a distance corresponding to the half of the wavelength of the wireless signal is maintained between the transmission antennas, the signal transmitted from each transmission antenna is affected by a wireless channel with low correlation. When a band of the transmitted wireless signal is 2 GHz, the distance is 7.5 cm, and when the band is higher than 2 GHz, the distance becomes shorter.

The tens or more of transmission antennas disposed in the BS 100 in FIG. 1 are used to transmit a signal to one or a plurality of terminals as 120. An appropriate precoding is applied to the plurality of transmission antennas to simultaneously transmit the signal to the plurality of terminals. In this case, one terminal may receive one or more information streams. In general, the number of information streams that may be received by one terminal is determined depending on the number of reception antennas that the terminal has and channel situation.

In order to effectively implement the FD-MIMO system, the terminal needs to accurately measure the channel state and a size of interference and transmit effective CSI to the BS using the measurement result. The BS that receives the CSI determines to which terminals the transmission is performed, at which data transmission rate the transmission is performed, which precoding is applied, and the like in a DL transmission, by using the received CSI. In a case of the FD-MIMO system, since the number of transmission antennas is large, when the method for transmitting and receiving CSI of the LTE and LTE-A systems according to the related art is used, an UL overhead problem in which a large amount of control information should be transmitted to the UL occurs.

The mobile communication system has limited time, frequency, and power resource. Therefore, when more resources are allocated to the reference signal, resources that may be allocated to data transmission through a data traffic channel are decreased, such that an absolute amount of transmitted data may be reduced. In this case, although performance of channel measurement and estimation is improved, the absolute amount of transmitted data is decreased, thus overall system capacity performance may be rather deteriorated. Therefore, appropriate distribution of the resources for the reference signal and the resources of the signal for the data transmission is needed in order to implement best performance in view of overall system capacity.

Figure 2:
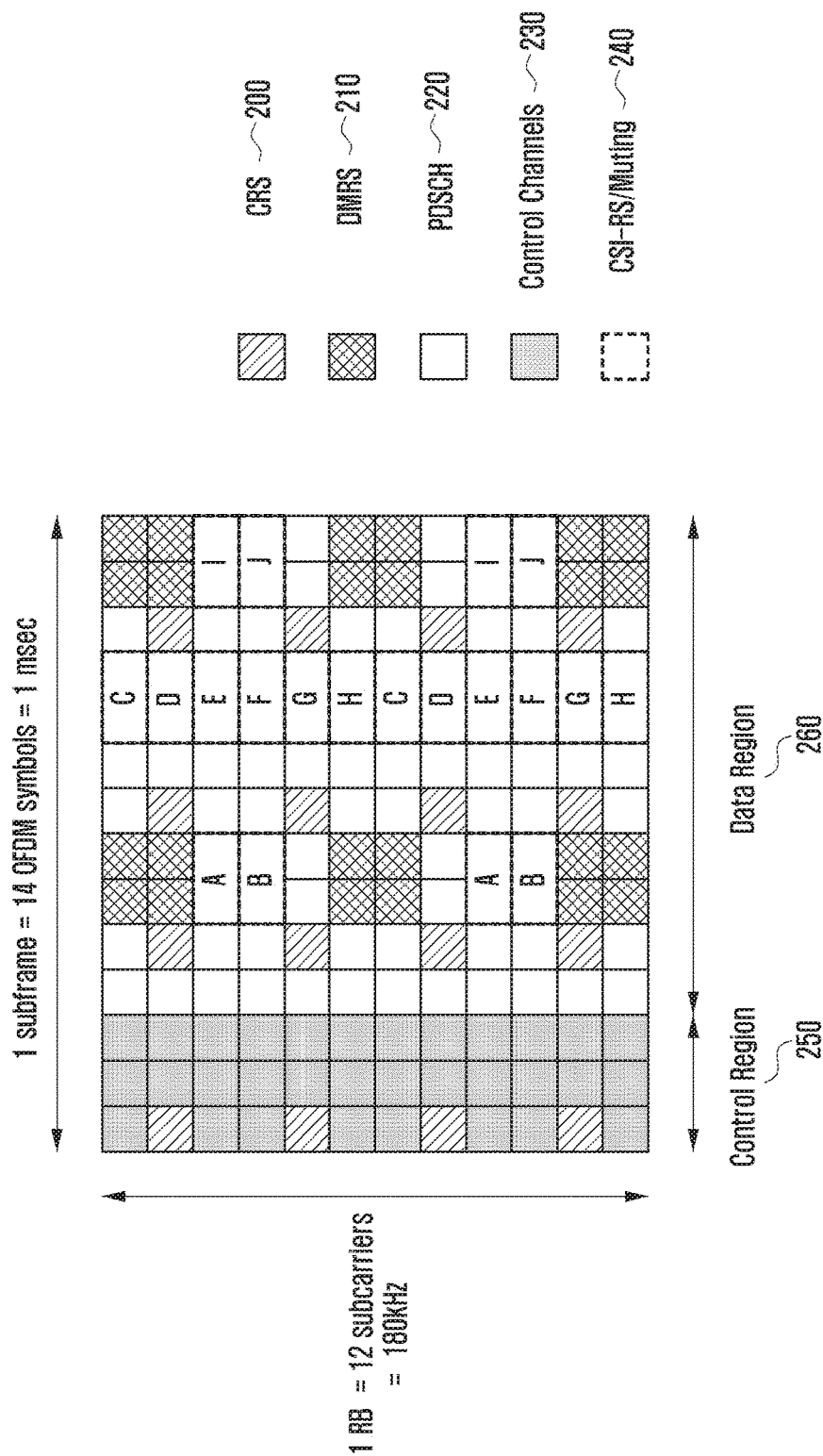
FIG. 2 is a diagram illustrating a radio resource of one subframe and one resource block (RB), which are minimum units of downlink (DL) scheduling in the long-term evolution LTE) and LTE advanced (LTE-A) systems according to an embodiment of the present disclosure.

FIG. 2 is a diagram illustrating a radio resource of one subframe and one resource block (RB), which are minimum units of DL scheduling in the LTE and LTE-A systems according to an embodiment of the present disclosure.

The radio resource illustrated in FIG. 2 is configured of one subframe on a time-axis and one RB on a frequency-axis. The radio resource includes 12 subcarriers in a frequency domain and includes 14 OFDM symbols in a time domain to have a total of 168 natural frequencies and time positions. In the LTE and LTE-A, each natural frequency and time position are referred to as a resource element (RE).

In the radio resource illustrated in FIG. 2, a plurality of different types of signals as follows may be transmitted.

Cell specific reference signal (RS) (CRS, 200): The CRS is a reference signal periodically transmitted to all the terminals belonging to one cell, which may be commonly used by a plurality of terminals.

Demodulation reference signal (DMRS, 210): The DMRS is a reference signal transmitted to a specific terminal, which is transmitted only when data is transmitted to the corresponding terminal. The DMRS may include a total of 8 DMRS antenna ports. In LTE and LTE-A systems, ports 7 to 14 correspond to the DMRS antenna port, and each antenna port maintains orthogonality by using code division multiplexing (CDM) or frequency division multiplexing (FDM) not to generate interference therebetween.

Physical DL shared channel (PDSCH, 220): The PDSCH is a DL data channel and used for the BS to transmit traffic (data) to the terminal and the traffic is transmitted on RE in which the reference signal is not transmitted in the data region 260.

CSI reference signal (CSI-RS, 240): The CSI-RS is a reference signal transmitted to the terminals belonging to one cell, and used to measure a channel state. A plurality of CSI-RSs may be transmitted to one cell.

Other control channels (physical hybrid ARQ indicator channel (PHICH), physical control format indicator channel (PCFICH), physical DL control channel (PDCCH), 240): The other control channels are used to provide control information required for the terminal to receive data on the PDSCH or transmit ACK/NACK for hybrid automatic repeat request (HARQ) operation for UL data transmission.

In addition to the above signals, in the LTE-A system, muting may be set so that the CSI-RS transmitted from the other BS may be received by the terminals of the corresponding cell without interference. The muting may be applied to a position at which the CSI-RS may be transmitted, and generally, the terminal receives a traffic signal while hopping the corresponding radio resource. In the LTE-A system, the muting is also referred to as a zero-power CSI-RS. The reason is that the muting is applied to the position of CSI-RS due to characteristics of the muting, and transmission power is not transmitted.

Referring to FIG. 2, the CSI-RS may be transmitted by using a part of the positions represented by A, B, C, D, E, F, G, H, I, and J based on the number of antennas ports (hereinafter, also referred to as port) transmitting the CSI-RS. Further, the muting may also be applied a part of the positions represented by A, B, C, D, E, F, G, H, I, and J. In particular, the CSI-RS may be transmitted using 2, 4, and 8 REs depending on the number of antenna ports. When the number of antenna ports is 2, the CSI-RS is transmitted to a half of a specific pattern in FIG. 2, when the number of antenna ports is 4, the CSI-RS is transmitted to the entire specific pattern, and when the number of antenna ports is 8, the CSI-RS is transmitted using two patterns. Meanwhile, the muting is always applied in one pattern unit. That is, although the muting may be applied to a plurality of patterns, in a case in which the position of the muting does not overlap the position of the CSI-RS, the muting may not be applied to only a part of one pattern. However, only when the position of the CSI-RS and the position of the muting overlap each other, the muting may be applied to only a part of one pattern.

When the CSI-RS for two antenna ports is transmitted, of the CSI-RS is transmitted according to each antenna port in two REs connected on the time-axis and a signal of each antenna port is classified by an orthogonal code. Further, when the CSI-RS for four antenna ports is transmitted, two more REs are additionally used in addition to those in the case of the CSI-RS for two antenna ports, and a CSI-RS for the rest two antenna ports is transmitted in the same manner as described above. A case in which the CSI-RS for eight antenna ports is transmitted is the same as described above.

In a cellular system, the reference signal needs to be transmitted in order to measure the DL channel state. In the LTE-A system of 3GPP, the terminal measures a channel state between the terminal and the BS by using a CRS or a CSI-RS transmitted by the BS. For the channel state, basically, several factors including an interference amount in the DL need to be considered. The interference amount in the DL includes an interference signal, thermal noise, and the like generated by the antenna belonging to the adjacent BS, and the interference amount is an important factor for the terminal to determine the channel situation of the DL. As an example, when a BS having one transmission antenna transmits a reference signal to a terminal having one reception antenna, the terminal should determine energy per symbol (Es) that may be received in a DL and an interference amount (interference density ratio, Io) to be simultaneously received in a section in which the corresponding symbol is received, and decide Es/Io (a ratio of energy per symbol to interference amount) by using a reference signal transmitted from the BS. The decided Es/Io is converted to a data transmission rate or a value corresponding thereto, and notified to the BS in a form of a channel quality indicator (CQI), thereby allowing the BS to determine the data transmission rate at which the BS performs transmission to the terminal in the DL.

In the LTE-A system, the terminal feeds back information on the channel state of the DL to the BS to allow the BS to utilize the information for DL scheduling. That is, the terminal measures the reference signal transmitted by the BS in the DL, and feeds back the information extracted therefrom to the BS in a form defined in the LTE and LTE-A standards. Information fed back by the terminal in the LTE and LTE-A largely includes the following three information:

Rank indicator (RI): The number of spatial layer that may be received by the terminal in the current channel state.

Precoder matrix indicator (PMI) An indicator for a precoding matrix preferred by the terminal in the current channel state.

CQI A maximum data rate at which the terminal may perform reception in the current channel state. The CQI may be replaced with a signal to interference and noise ratio (SINR), a maximum error correcting code rate and modulation scheme, data efficiency per frequency, and the like that may be used similarly to the maximum data transmission rate.

The RI, PMI, and CQI have meanings by being associated with each other. As an example, the precoding matrix supported by the LTE and LTE-A, is defined different for each rank. Therefore, a PMI value X when the RI has a value of 1 and a PMI value X when the RI has a value of 2 are differently interpreted from each other. Further, when the terminal determines the CQI, it is assumed that a PMI and X that are notified to the BS by the terminal are applied in the BS. That is, notifying the BS of RI_X, PMI-Y, and CQI_Z by the terminal means notifying that the terminal may perform reception at a data transmission rate corresponding to CQI_Z when the rank is RI_X, and the precoding is PMI_Y at the time of data transmission of the BS. As such, in calculating the CQI, the terminal assumes which transmission scheme is used for the BS, thereby obtaining best performance when the corresponding transmission scheme is used for actual transmission.

In LTE and LTE-A systems, a periodic feedback of the terminal is configured in one of four feedback modes (reporting modes) as follows depending on what information the periodic feedback includes 1. Reporting mode 1-0: RI, wideband CQI (wCQI)
2. Reporting mode 1-1: RI, wCQI, PMI
3. Reporting mode 2-0: RI, wCQI, subband CQI (sCQI)
4. Reporting mode 2-1: RI, wCQI, sCQI, PMI A feedback timing of each information for the four feedback modes is determined by a value of $N_{pd}$, $N_{OFFSET,CQI}$, $M_{RI}$, $N_{OFFSET,RI}$, and the like transmitted as a higher layer signal. In feedback mode 1-0, a transmission period of the wCQI is $N_{pd}$, and the feedback timing is determined based on a subframe offset value of $N_{OFFSET,CQI}$. Further, a transmission period of the RI is $N_{pd} \cdot M_{RI}$, and an offset value is $N_{OFFSET,CQI}+N_{OFFSET,RI}$.

Figure 3:
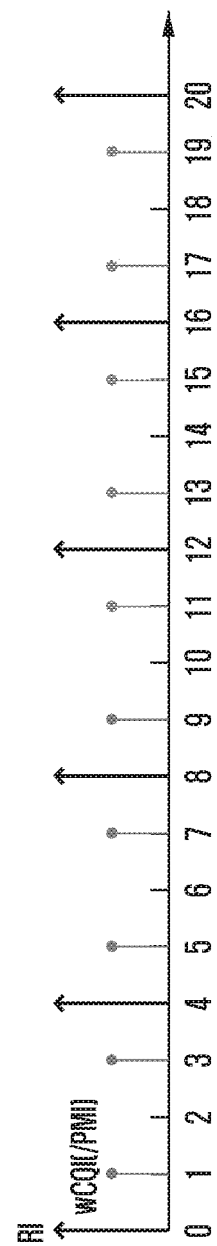
FIG. 3 is a diagram illustrating a feedback timing of RI and wCQI in a case in which $N_{pd}=2$, $M_{RI}=2$, $N_{OFFSET,CQI}=1$, and $N_{OFFSET,RI}=-1$ according to an embodiment of the present disclosure.

FIG. 3 is a diagram illustrating a feedback timing of the RI and wCQI in a case in which $N_{pd}=2$, $M_{RI}=2$, $N_{OFFSET,CQI}=1$, and $N_{OFFSET,RI}=-1$ according to an embodiment of the present disclosure.

Referring to FIG. 3, each timing represents a subframe index.

Feedback mode 1-1 has the same feedback timing as feedback mode 1-0, but has a difference that the wCQI and PMI are transmitted together in the wCQI transmission timing.

In feedback mode 2-0, a feedback period for the sCQI is $N_{pd}$, and an offset value is $N_{OFFSET,CQI}$. Further, a feedback period for the wCQI is $H \cdot N_{pd}$, and an offset value is the same as that of the sCQI, that is, $N_{OFFSET,CQI}$. Here, it is defined that H=J·K+1, K is transmitted as a higher layer signal, and J is a value determined depending on a system bandwidth.

For example, a value of J for 10 MHz system is defined as 3. As a result, the wCQI is transmitted at an interval of a times of sCQI transmission in replace thereof. Further, a transmission period of the RI is $M_{RI} \cdot H \cdot N_{pd}$, and an offset value is $N_{OFFSET,CQI}+N_{OFFSET,RI}$.

Figure 4:
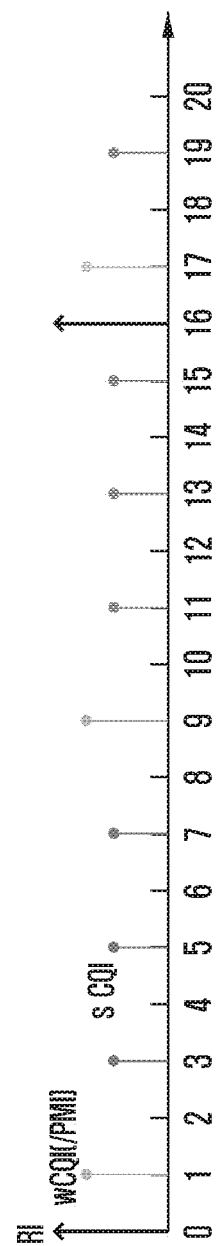
FIG. 4 is a diagram illustrating a feedback timing of RI, sCQI, and wCQI in a case in which $N_{pd}=2$, $M_{RI}=2$, J=3 (10 MHz), K=1, $N_{OFFSET,CQI}=1$, and $N_{OFFSET,RI}=-1$ according to an embodiment of the present disclosure.

FIG. 4 is a diagram illustrating a feedback timing of RI, sCQI, and wCQI in a case in which $N_{pd}=2$, $M_{RI}=2$, J=3 (10 MHz), K=1, $N_{OFFSET,CQI}=1$, and $N_{OFFSET,RI}=-1$ according to an embodiment of the present disclosure.

Feedback mode 2-1 has the same feedback timing as feedback mode 2-0, but has a difference that the PMI is transmitted together in the wCQI transmission timing.

In the case of the feedback timing described above, the number of CSI-RS antenna ports is four or less, and in a case of a terminal allocated with a CSI-RS for eight antenna ports, two PMI information need to be fed back unlike the feedback timing.

In the case in which eight CSI-RS antenna ports are allocated, feedback mode 1-1 is again divided into two submodes, and in a first submode, the RI is transmitted together with first PMI information, and second PMI information is transmitted together with the wCQI. Here, a feedback period and an offset value for the wCQI and the second PMI are defined as $N_{pd}$ and $N_{OFFSET,CQI}$, respectively, and a feedback period and an offset value for the RI and the second PMI information are defined as $M_{RI} \cdot N_{pd}$ and $N_{OFFSET,CQI}+N_{OFFSET,RI}$. Here, if a precoding matrix corresponding to the first PMI is W1, and a precoding matrix corresponding to the second PMI is W2, the terminal and the BS share information that a precoding matrix that the terminal prefers is determined as W1W2.

In a case of feedback mode 2-1 in the case in which the eight CSI-RS antenna ports are allocated, a feedback of precoding type indicator (PTI) information is added. The PTI is fed back together with the RI, and a period thereof is $M_{RI} \cdot H \cdot N_{pd}$, and an offset value is defined as $N_{OFFSET,CQI}+N_{OFFSET,RI}$.

If the PTI is 0, all of the first PMI, the second PMI, and the wCQI are fed back, the wCQI and the second PMI are transmitted together at the same timing, a period thereof is $N_{pd}$, and an offset value is $N_{OFFSET,CQI}$. Further, a period of the first PMI is $H' \cdot N_{pd}$, and an offset value is $N_{OFFSET,CQI}$. Here, H' is transmitted as a higher layer signal. On the other hands, if the PTI is 1, the PTI is transmitted together with the RI, the wCQI and the second PMI are transmitted together, and the sCQI is additionally fed back at a separate timing. In this case, the first PMI is not transmitted. A period and an offset value of the PTI and the RI are the same as those in the case in which the PTI is 0, and a period and an offset value of the sCQI are defined as $N_{pd}$ and $N_{OFFSET,CQI}$, respectively. Further, the wCQI and the second PMI is fed back while having a period of $H \cdot N_{pd}$, and an offset value of $N_{OFFSET,CQI}$, and H is defined as in the case in which the number of CSI-RS antenna ports is four.

Figure 5:
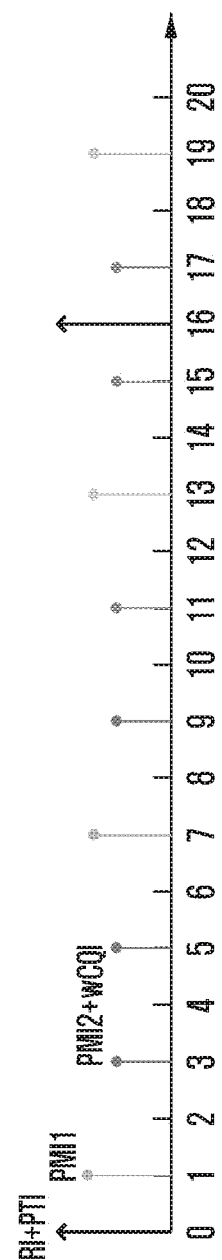
FIGS. 5 and 6 are diagrams illustrating feedback timings when PTI=0 and PTI=1 for a case in which $N_{pd}=2$, $M_{RI}=2$, J=3 (10 MHz), K=1, H'=3, $N_{OFFSET,CQI}=1$, and $N_{OFFSET,RI}=-1$ according to an embodiment of the present disclosure.
Figure 6:
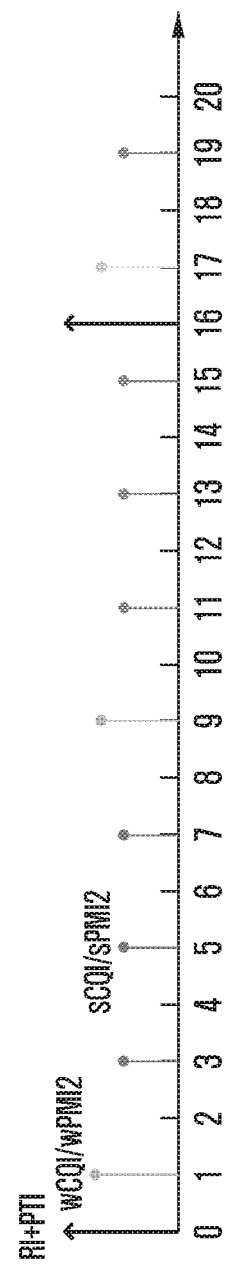

FIGS. 5 and 6 are diagrams illustrating feedback timings when PTI=0 and PTI=1 for a case in which $N_{pd}=2$, $M_{RI}=2$, J=3 (10 MHz), K=1, H'=3, $N_{OFFSET,CQI}=1$, and $N_{OFFSET,RI}=-1$ according to various embodiments of the present disclosure.

In LTE and LTE-A systems, an aperiodic feedback is also supported in addition to the period feedback of the terminal. When the BS desires to obtain aperiodic feedback information of a specific terminal, the BS sets an aperiodic feedback indicator included in DL control information (DCI) for UL data scheduling of the corresponding terminal to perform a specific aperiodic feedback and transmits the indicator to the corresponding terminal, thereby performing the UL data scheduling of the corresponding terminal. When the corresponding terminal receives the indicator set to perform the aperiodic feedback in an n-th subframe, the corresponding terminal performs UL transmission by including aperiodic feedback information in data transmission in an n+k-th subframe. Here, k that is a parameter defined in 3GPP LTE release 11 standard, is 4 in frequency division duplexing (FDD) system and defined as the following Table 1 in time division duplexing (TDD) system.

TABLE 1

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

When the aperiodic feedback is configured, the feedback information includes the RI, the PMI, and the CQI as in the case of the period feedback, and the RI and the PMI may not be fed back depending on the feedback configuration. Further, the CQI may include both of wCQI and sCQI, or may also include only wCQI information.

Table 2 below is a table showing a reporting type of periodic CSI reporting performed using PUCCH, reported information for each reporting type, and a payload size of the used information.

according to the PUCCH reporting mode and the reporting instance of the periodic CSI reporting as shown in Table 2. However, in the case of the periodic CSI reporting, the terminal may transmit only information according to one PUCCH reporting type at one reporting point in time due to characteristics of the reporting using the PUCCH of which the allocated resource and the size of the payload that may be transmitted are limited. Therefore, when reporting points in time between CSI processes in one cell collide with each other, or reporting points in time between cells different from each other collide with each other in a carrier aggregation (CA) situation, priority is determined depending on the PUCCH reporting type, thereby resolving the collision.

Here, a criterion for determining priority is a reporting period. The longer the reporting period, the higher the priority is (that is, it is more important information), and the shorter the reporting period, the lower the priority is. In the release 12 standard, priority is given in an order of RI>wideband PMI>wideband CQI>subband PMI and CQI, and in the case of the reporting between cells different from each other, if reporting having the same priority of different cells collide with each other, information of a cell having a

TABLE 2

| PUCCH Reporting Type | Reported | Mode State | PUCCH Reporting Modes | | | |
|---|---|---|---|---|---|---|
| | | | Mode 1-1 (bits/BP) | Mode 2-1 (bits/BP) | Mode 1-0 (bits/BP) | Mode 2-0 (bits/BP) |
| 1 | Sub-band CQI | RI = 1 | NA | 4 + L | NA | 4 + L |
| | | RI > 1 | NA | 4 + 3 + L | NA | 4 + L |
| 1a | Sub-band CQI/second PMI | 8 ports, RI = 1 | NA | 4 + 4 + L | NA | NA |
| | | 8 ports, 1 < RI < 5 | NA | 4 + 2 + 3 + L | NA | NA |
| | | 8 ports, RI > 4 | NA | 4 + 3 + L | NA | NA |
| 2 | Wideband CQI/PMI | 2 ports, RI = 1 | 4 + 2 | 4 + 2 | NA | NA |
| | | 4 ports, RI = 1 | 4 + 4 | 4 + 4 | NA | NA |
| | | 2 ports, RI > 1 | 4 + 1 + 3 | 4 + 1 + 3 | NA | NA |
| | | 4 ports, RI > 1 | 4 + 4 + 3 | 4 + 4 + 3 | NA | NA |
| 2a | Wideband first PMI | 8 ports, RI < 3 | NA | 4 | NA | NA |
| | | 8 ports, 2 < RI < 8 | NA | 2 | NA | NA |
| | | 8 ports, RI = 8 | NA | 0 | NA | NA |
| 2b | Wideband CQI/second PMI | 8 ports, RI = 1 | 4 + 4 | 4 + 4 | NA | NA |
| | | 8 ports, 1 < RI < 4 | 4 + 4 + 3 | 4 + 4 + 3 | NA | NA |
| | | 8 ports, RI = 4 | 4 + 3 + 3 | 4 + 3 + 3 | NA | NA |
| | | 8 ports, RI > 4 | 4 + 3 | 4 + 3 | NA | NA |
| 2c | Wideband CQI/first PMI/second PMI | 8 ports, RI = 1 | 4(CQI) + 4(PMI) | NA | NA | NA |
| | | 8 ports, 1 < RI ≤ 4 | 4(CQI) + 4(PMI) + 3 (spatial differential CQI) | NA | NA | NA |
| | | 8 ports, 4 < RI ≤ 7 | 4(CQI) + 2(PMI) + 3 (spatial differential CQI) | NA | NA | NA |
| | | 8 ports, RI = 8 | 4(CQI) + 3(spatial differential CQI) | NA | NA | NA |
| 3 | RI | 2/4 ports, 2-layer SM | 1 | 1 | 1 | 1 |
| | | 8 ports, 2-layer SM | 1 | NA | NA | NA |
| | | 4 ports, 4-layer SM | 2 | 2 | 2 | 2 |
| | | 8 ports, 4-layer SM | 2 | NA | NA | NA |
| | | 8-layer SM | 3 | NA | NA | NA |
| 4 | Wideband CQI | RI = 1 or RI > 1 | NA | NA | 4 | 4 |
| 5 | RI/first PMI | 8 ports, 2-layer SM | 4 (Jointly coded RI + first PMI) | NA | NA | NA |
| | | 8 ports, 4 and 8 layer SM | 5 (Jointly coded RI + first PMI) | | | |
| 6 | RI/PTI | 8 ports, 2-layer SM | NA | 1 + 1 | NA | NA |
| | | 8 ports, 4-layer SM | NA | 2 + 1 | NA | NA |
| | | 8 ports, 8-layer SM | NA | 3 + 1 | NA | NA |

4 CQI
3 Spatial differential CQI
T PMI
J Jointly coded RI + first PMI
P Precoder Type Indication (PTI)

The terminal transmits RI, PTI, PMI, and CQI information, and the like using a required PUCCH reporting type lower cell index is transmitted to solve the collision. Further, when certain information is not reported due to collision, remaining periodic CSI reporting is continued using the corresponding information that is most recently reported. For example, if the wideband PMI information is not reported, and the wideband PMI that is most recently reported is 0, the terminal reports the remaining second PMI and CQI information under an assumption that the wideband PMI at the current reporting point in time is also 0.

In LTE and LTE-A systems, a codebook subsampling function is provided for the periodic CSI reporting. In LTE and LTE-A system, the periodic feedback of the terminal is transmitted to the BS through the PUCCH. Since an amount of information that may be transmitted at a time through the PUCCH is limited, various feedback objects such as the RI, wCQI, the sCQI, the PMI1, the wPMI2, the sPMI2, and the like are transmitted through the PUCCH by subsampling, or joint-encoding in which two or more feedback information are encoded together.

As an example, if the number of CSI-RS port set by the BS is eight, the RI and the PMI1 reported in submode 1 of PUCCH mode 1-1 may be joint-encoded as shown in the following Table 3. Based on Table 3, the RI configured of 3 bits and the PMI1 configured of 4 bits are joint-encoded into a total of 5 bits. In submode 2 of PUCCH mode 1-1, as shown in Table 4, the PMI1 configured of 4 bits and the PMI2 configured of another 4 bits are joint-encoded into a total of 4 bits. Since a level of subsampling is higher as compared to submode 1 (in the case of submode 1, 4 cases are subsampled into 3 cases, in the case of submode 2, 8 cases are subsampled into 4 cases), more precoding indices may not be reported.

As another example, if the number of CSI-RS port set by the BS is eight, the PMI2 reported in PUCCH mode 2-1 may be subsampled as shown in the following Table 5. Referring to Table 5, when an associated RI is 1, the PMI2 is reported as 4 bits. However, it may be appreciated that if the associated RI is 2 or more, since a differential CQI for second codeword needs to be additionally reported together, the PMI2 is subsampled and reported as 2 bits.

In LTE and LTE-A systems, a total of six subsampling or joint encoding for a periodic feedback including Table 3, 4, and 5 may be applied.

TABLE 3

| Value of joint encoding of RI and the first PMI $I_{RI/PMI1}$ | RI | Codebook index $i_1$ |
|---|---|---|
| 0-7 | 1 | $2I_{RI/PMI1}$ |
| 8-15 | 2 | $2(I_{RI/PMI1}-8)$ |
| 16-17 | 3 | $2(I_{RI/PMI1}-16)$ |
| 18-19 | 4 | $2(I_{RI/PMI1}-18)$ |
| 20-21 | 5 | $2(I_{RI/PMI1}-20)$ |
| 22-23 | 6 | $2(I_{RI/PMI1}-22)$ |
| 24-25 | 7 | $2(I_{RI/PMI1}-24)$ |
| 17 | 8 | 0 |
| 27-31 | reserved | NA |

TABLE 4

| | Relationship between the first PMI value and codebook index $i_1$ | | Relationship between the second PMI value and codebook index $i_2$ | | |
|---|---|---|---|---|---|
| RI | Value of the first PMI $I_{PMI1}$ | Codebook index $i_1$ | Value of the second PMI $I_{PMI2}$ | Codebook index $i_2$ | total #bits |
| 1 | 0-7 | $2I_{PMI1}$ | 0-1 | $2I_{PMI2}$ | 4 |
| 2 | 0-7 | $2I_{PMI1}$ | 0-1 | $I_{PMI2}$ | 4 |

TABLE 4-continued

| | Relationship between the first PMI value and codebook index $i_1$ | | Relationship between the second PMI value and codebook index $i_2$ | | |
|---|---|---|---|---|---|
| RI | Value of the first PMI $I_{PMI1}$ | Codebook index $i_1$ | Value of the second PMI $I_{PMI2}$ | Codebook index $i_2$ | total #bits |
| 3 | 0-1 | $2I_{PMI1}$ | 0-7 | $4\lfloor I_{PMI2}/4 \rfloor + I_{PMI2}$ | 4 |
| 4 | 0-1 | $2I_{PMI1}$ | 0-7 | $I_{PMI2}$ | 4 |
| 5 | 0-3 | $I_{PMI1}$ | 0 | 0 | 2 |
| 6 | 0-3 | $I_{PMI1}$ | 0 | 0 | 2 |
| 7 | 0-3 | $I_{PMI1}$ | 0 | 0 | 2 |
| 8 | 0 | 0 | 0 | 0 | 0 |

TABLE 5

Relationship between the second PMI value and codebook index $i_2$

| RI | Value of the second PMI $I_{PMI2}$ | Codebook index $i_2$ |
|---|---|---|
| 1 | 0-15 | $I_{PMI2}$ |
| 2 | 0-3 | $2I_{PMI2}$ |
| 3 | 0-3 | $8 \cdot \lfloor I_{PMI2}/2 \rfloor + (I_{PMI2} \bmod 2) + 2$ |
| 4 | 0-3 | $2I_{PMI2}$ |
| 5 | 0 | 0 |
| 6 | 0 | 0 |
| 7 | 0 | 0 |
| 8 | 0 | 0 |

Figure 7:
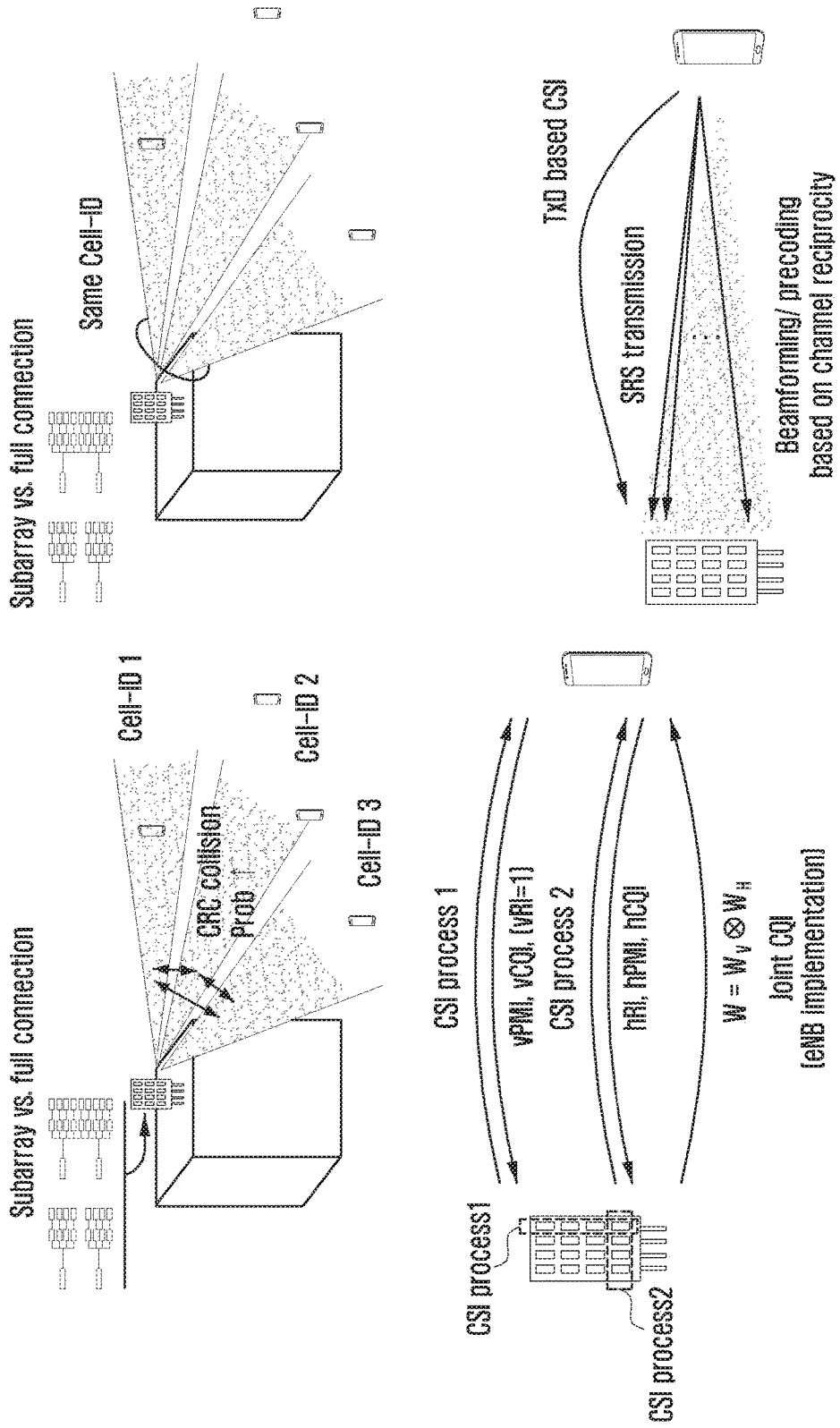
FIG. 7 is a diagram illustrating various scenarios that may be performed using a beamformed CSI-RS in the FD-MIMO according to an embodiment of the present disclosure.

FIG. 7 is a diagram illustrating various scenarios that may be performed using a beamformed CSI-RS in the FD-MIMO according to an embodiment of the present disclosure.

There are two methods for supporting a plurality of antennas supported in the FD-MIMO. The two methods include a non-precoded (NP) CSI-RS, and a beamformed CSI-RS. The NP CSI-RS is a method in which the BS transmits a CSI-RS having a wide beamwidth to the terminal like the existing CSI-RS, and the terminal transmits RI, PMI, and CQI matching the corresponding beam to the BS. In the existing release-11 LTE, up to 8 CSI-RS antenna ports are supported, however, a method of supporting various numbers of NP CSI-RS ports such as 12, 16, 32, and 64 to support the FD-MIMO and a two-dimensional (2D) codebook for PMI reporting may be considered.

On the other hand, the BF CSI-RS is a method of dividing an entire beam area into one dimension (ID) or 2D to be used in order to optimize the number of codebook and the CSI-RS overhead calculated by the terminal at a time. At this time, the BF CSI-RS may be again divided into a cell-specific BF CSI-RS and a UE-specific BF CSI-RS depending on a method of selecting, by the terminal, a required ID or 2D sector. The cell-specific BF CSI-RS is a method in which, in a viewpoint of a cell, a plurality of same beams is transmitted to the terminal, and the terminal selects a beam on the basis of CSI reporting performed based on the transmitted beams, and transmits data. At this time, information such as a CSI-RS resource index (CRI) or a beam index (BI) may be included in the CSI reporting transmitted by the terminal. This is to allow the terminal to select information on a preferred beam when there are multiple CSI-RS resources or CSI-RS ports for one CSI process. In the existing method, to this end, the BS needs to select a beam by setting a plurality of CSI processes and receiving all CSI of each thereof, however, if the terminal performs the selection, it is possible to save UL resources and reduce operation complexity of the BS.

At this time, such a BI or CRI may also cause collision similarly to the RI, PMI, and CQI used in the existing periodic CSI reporting. Accordingly, in consideration of such a collision, priority needs to be set, and an agreement on an operation when the collision occurs needs to be made. Further, as described above, in the existing method, it is assumed that the same information most recently reported is applied, but since a beam assumed by the CRI or a resource with different TP may be assigned, statistical characteristics of a measured channel may be changed. Therefore, it is dangerous to use the same information most recently reported in the corresponding periodic CSI reporting as in the existing method.

Therefore, in the LTE-A release 13 standard, in order to avoid the problem as above, priority is given in an order of CRI>RI>wideband PMI>wideband CQI>subband PMI and CQI, and in the case of the reporting between cells different from each other or CSI processes, if reporting having the same priority collide with each other, information of a cell having a lower cell index or a cell or SCI process having a lower CSI process ID is transmitted to solve the collision (that is, transmit only reporting corresponding to the lowest CSI process ID).

Second Embodiment

The BS may transmit various types of CSI-RS according to an environment such as a transmission method, a degree of change of a channel, or accuracy of channel estimation, and allow the terminal to estimate the CSI-RS. Representative examples of the various types of CSI-RS include a cell-specific beamformed CSI-RS and a UE-specific beamformed CSI-RS described above. In a case of the UE-specific beamformed CSI-RS, prior information is required for forming a terminal-specific beam, thus if CSI reporting of the cell-specific beamformed CSI-RS and CSI reporting of the US-specific beamformed CSI-RS collide with each other, priority of the two reporting needs to be set. In an existing system, the abovementioned problem has been solved by setting priority of CRI that is a reporting element based on the cell-specific beamformed CSI-RS to be higher than RI, PMI, and CQI. However, in a case of partial port CSI-RS in which antennas of the BS are divided into two or more CSI-RS subgroups and the terminal is allowed to measure each subgroup to reduce burden of CSI generation and reporting, the CRI reporting may be omitted, thus an additional priority rule is needed.

Specifically, priority setting by the CRI may be insufficient in a certain environment. A hybrid CSI environment in which a first enhanced multiple input multiple output (eMIMO)-type is set as 'Class B with K>1', and a second eMIMO-type is set as 'Class B with K=1' in one CSI process is an example.

Setting the first eMIMO-type as 'Class B with K>1' means that first CSI setting is a setting for a cell-specific beamformed CSI-RS configured of K CSI-RS resources. The BS may obtain terminal direction information through the CRI, RI, and PMI through first eMIMO-type CSI reporting of the setting as described above or obtain terminal direction information by operating K resources as partial port CSI-RS. Setting the second eMIMO-type as 'Class B with K=1' means that second CSI setting is a setting for a UE-specific beamformed CSI-RS configured of one CSI-RS resource. The BS may provide a terminal-specific beamformed CSI-RS through the second eMIMO-type of the setting as described above and obtain an accurate CSI corresponding thereto.

Figure 8:
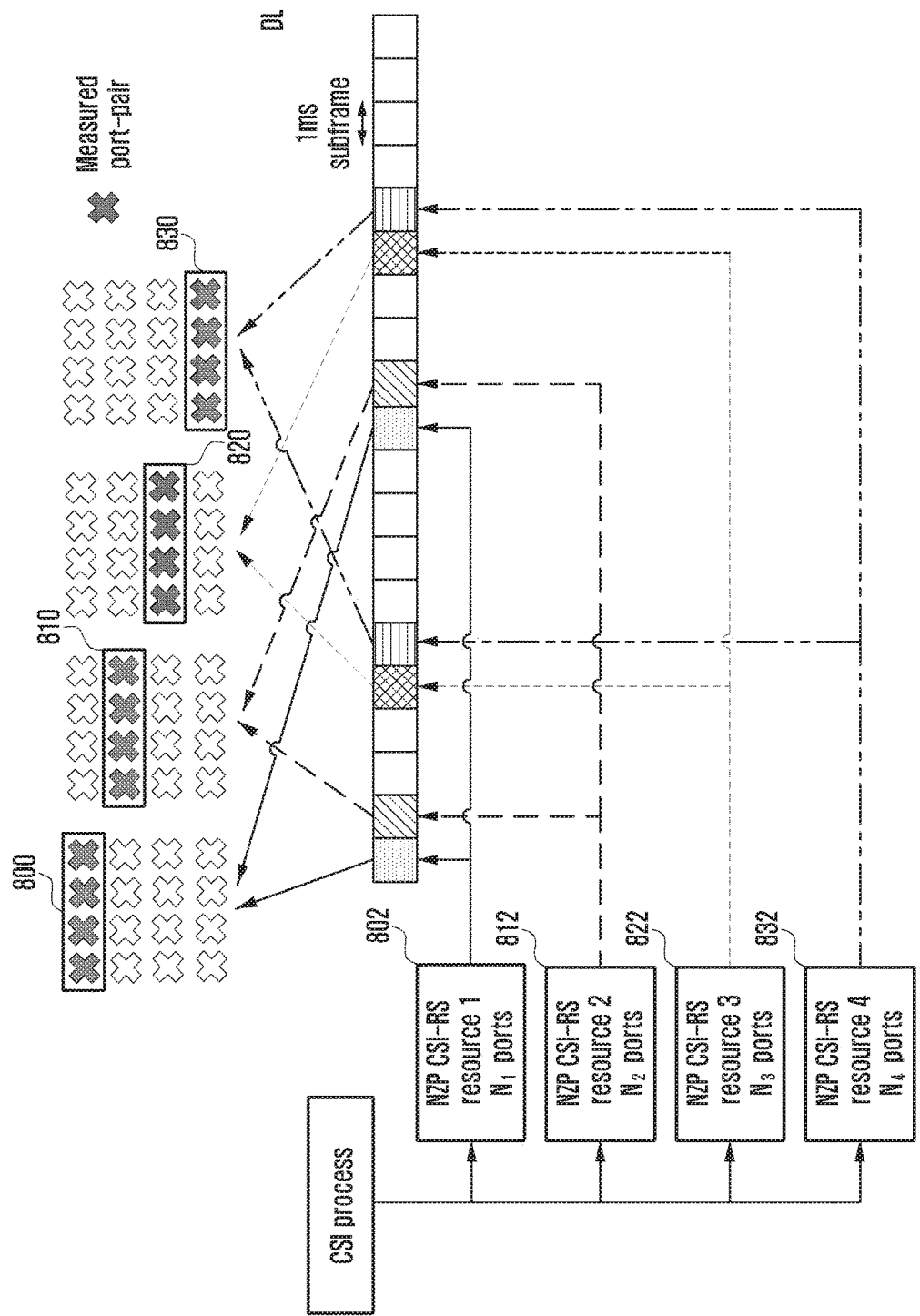
FIGS. 8 and 9 are diagrams illustrating examples of operating partial port CSI-RS based on a setting that enhanced multiple input multiple output (eMIMO)-Type='Class B with K>1' according to an embodiment of the present disclosure.
Figure 9:
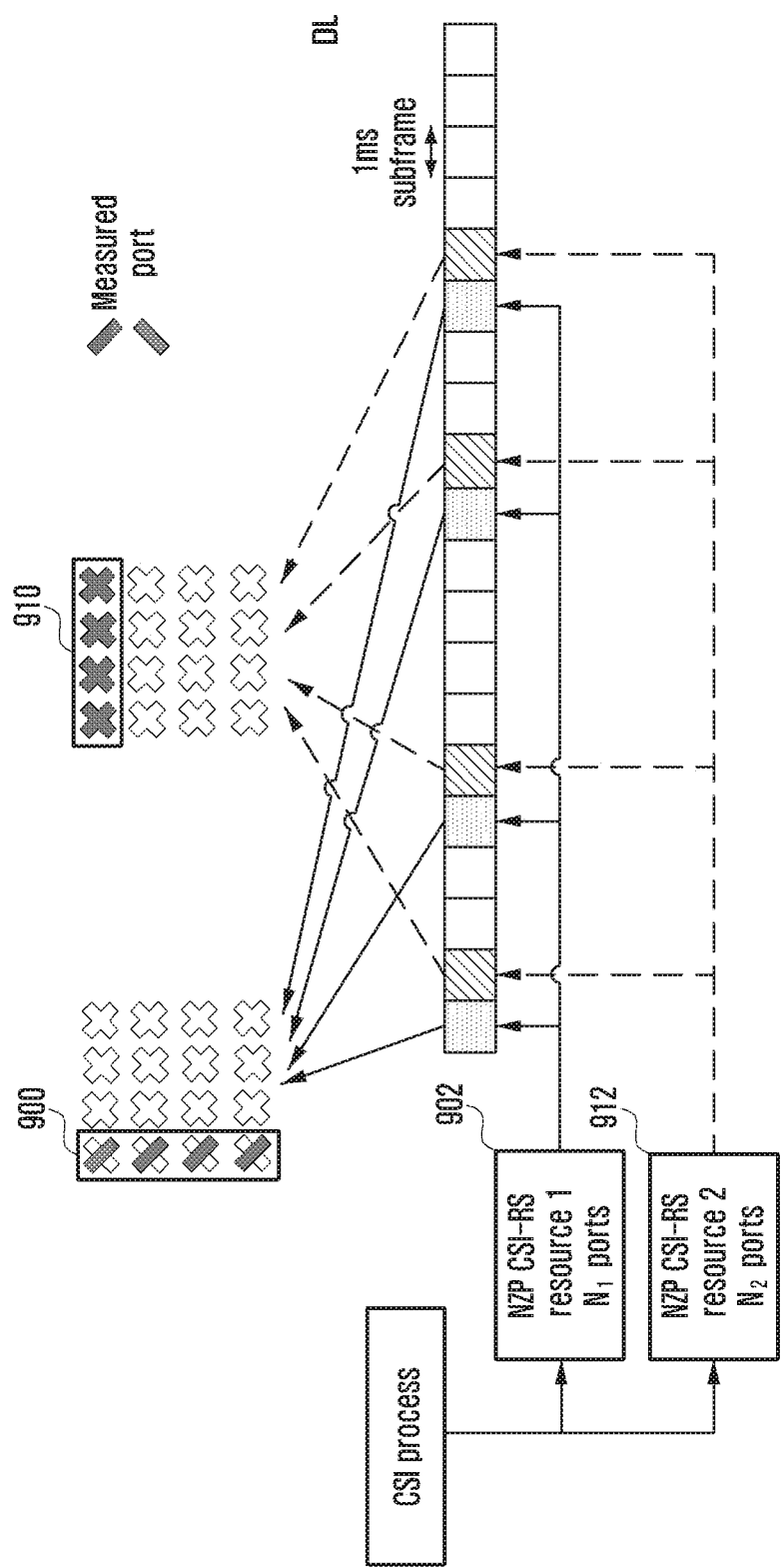

FIGS. 8 and 9 are diagrams illustrating examples of operating partial port CSI-RS based on a setting that eMIMO-Type='Class B with K>1' according to various embodiments of the present disclosure.

FIG. 8 is an example of a partial port CSI-RS of a case in which a sum of the number of ports of each CSI-RS resource is the same as the total number of antenna ports of the BS $$\left(\sum_{i=1}^{K} P_i = P\right)$$

according to an embodiment of the present disclosure.

Referring to FIG. 8, a total 32 CSI-RS ports may be transmitted by being divided through four 8-port CSI-RSs 800, 810, 820, and 830. At this time, the four CSI-RSs may be allocated to one CSI process by setting the eMIMO-type as 'Class B with K>1', and 'K=4'. Each 8-port CSI-RS may be configured as nonzero power (NZP) CSI-RS resource 1 (802), NZP CSI-RS resource 2 (812), NZP CSI-RS resource 3 (822) and NZP CSI-RS resource 4 (832). At this time, the terminal may perform independent or associated four CSI reporting with respect to the four 8-port CSI-RSs. As in the example of FIG. 8, in a case in which an antenna port array is divided in a form of (1 by 4), it is possible to generate and report CSI by using release 10 8Tx codebook based on uniform linear array (ULA). On the other hand, the antenna port array may also be divided in a form of (2 by 2), and in this case, it is possible to generate and report channel state by using release 13 8Tx codebook set to be (N1=2, N2=2).

In the case of the partial port CSI-RS illustrated in FIG. 8, it may be appreciated that unlike the existing Class B K>1 reporting in which a CSI-RS index selected among multiple CSI-RSs and a corresponding CSI are reported, CSIs for all CSI-RSs need to be reported. Accordingly, in the case of the partial port CSI-RS, CRI reporting may be omitted.

FIG. 9 is an example of a partial port CSI-RS of a case in which a sum of the number of ports of each CSI-RS resource is smaller than the total number of antenna ports of the BS $$\left(\sum_{i=1}^{K} P_i < P\right).$$

This means that it is possible to additionally reduce burden of CSI-RS transmission according to an embodiment of the present disclosure.

Referring to FIG. 9, a first CSI-RS has CSI-RS ports 900 (in FIG. 9, a vertical direction antenna is illustrated) of which the number is N1 that is the same as the number of vertical (or horizontal) direction antennas, and a second CSI-RS is configured of 2*N2 CSI RS ports 910 (in FIG. 9, a horizontal direction antenna is illustrated) in consideration of the number of horizontal (or vertical) direction antennas and a dual-polarized antenna structure. That is, the terminal estimates only a channel for part of antenna ports of the BS.

Thereafter, the terminal may perform independent or associated two CSI reporting with respect to the two CSI-RSs similarly to FIG. 8. According to an example of FIG. 9, the first CSI-RS generates channel information according to 4tx codebook, and the second CSI-RS generates channel information according to 8tx codebook. Even in the example of FIG. 9, unlike the existing Class B K>1 reporting, CSIs for all CSI-RSs need to be reported, thus CRI reporting may be omitted.

As described above, in the case of the partial port CSI-RS, even in the case in which eMIMO-Type='Class B', the CRI may not be reported, thus it is impossible to set priority of reporting through the CRI. In particular, in the case of the hybrid CSI, since a plurality of eMIMO-types are set in one CSI process, it is impossible to set priority in an order of cell index or CSI process ID.

To solve this problem, the present an embodiment provides two methods as below.

A first method is to specify that priority of CSI reporting related to the first eMIMO-type is higher than that of CSI reporting related to the second eMIMO-type. This method may be identically applied regardless of an accurate setting value of the first eMIMO-type and the second eMIMO-type. This is to provide the same solution regardless of a specific setting value in consideration of implementation complexity of the BS and the terminal.

Further, in relation to the cell index or CSI process ID, the following two examples may be applied. A first example is that priority by an order of eMIMO-type takes precedence over priority by the cell index or CSI process ID. This means that if reporting types having the same priority among the CRI, RI, wideband PMI, wideband CQI, subband PMI, and CQI collide with each other, reporting having high priority according to the eMIMO-type is performed. Specifically, priority between eMIMO-types may be defined as $1^{st}$ eMIMO-Type (for hybrid)>$2^{nd}$ eMIMO-Type (for hybrid)=eMIMO-Type (for non-hybrid)=without eMIMO-Type. This is in consideration of a reporting period of the first eMIMO-type that is longer several times to tens of times the second eMIMO-type in the hybrid CSI.

A second example is that the priority by the cell index or CSI process ID takes precedence over the priority by an order of eMIMO-type. This means that if reporting types having the same priority among the CRI, RI, wideband PMI, wideband CQI, subband PMI, and CQI collide with each other in the same cell or same CSI process, reporting having an earlier order by the eMIMO-type is performed.

A second method is to set priority of CSI reporting associated with eMIMO-Type='Class A' or eMIMO-Type='Class B' with K>1 to take precedence over priority of CSI reporting associated with eMIMO-Type='Class B' with K=1. This method is to provide appropriate different solutions according to an accurate setting value of the eMIMO-type. In this method, an agreement may be made so that it is applied only in one CSI process, or it is applied with respect to all reporting regardless of a CSI process. The application in one CSI process means that the priority according to an order of CSI process ID takes precedence over the priority according to eMIMO-type setting, and the application with respect to all reporting regardless of a CSI process means that the priority according to eMIMO-type setting takes precedence over the priority according to an order of CSI process ID.

In the above description, a case in which the priority between reporting types takes precedence over the two methods is assumed. However, in another example, the two methods, that is, methods for setting priority by an order of eMIMO-type (first method) or the number of CSI-RS (K>1) (second method) may take precedence over the priority by the reporting type. In this case, priority is first determined by the two methods regardless of a kind of reporting types colliding with each other, and if the priority by the two methods is the same, the priority may be finally determined by the reporting type.

In a specific example, a first eMIMO-type may be set as Class B with K=2 in one CSI process, a CSI (PMI) based on each CSI-RS is agreed to assume rank 1 (that is, the RI is not reported), a second eMIMO-type may be set as Class B with K=1 to provide a UE-specific beamformed CSI-RS. Methods for priority rules as follows may be applied based on the above examples. The following methods for priority rules are not limited to the specific examples.

Case 1: In one CSI process, a PMI of a first eMIMO-type has higher priority than all reporting types of a second eMIMO-type.

Case 2: In one CSI process, a PMI of a first eMIMO-type has lower priority than an RI of a second eMIMO-type, and has higher priority than other reporting types.

Case 3: In any CSI process, a PMI of a first eMIMO-type has higher priority than all CSI reporting other than a first eMIMO-type of other CSI process. That is, PMI reporting of a first eMIMO-type in CSI process A has higher priority than reporting types other than an RI, PMI, CQI, or hybrid CSI of a second eMIMO-type of CSI process B.

Case 4: In any CSI process, a PMI of a first eMIMO-type has higher priority than all CSI reporting other than a CRI or RI of other CSI process. That is, PMI reporting of a first eMIMO-type in CSI process A has higher priority than a PMI and a CQI in CSI process B.

Case 5: Reporting priority between different CSI processes is determined by reporting type priority of CRI>RI>wideband PMI>wideband CQI>subband PMI and CQI, and priority according to CSI process ID. The reporting type priority may be first considered, and then the priority according to CSI process ID may be considered.

The different cases need not be exclusive to each other, and may be complementarily applied with each other in a certain situation. For example, in the same CSI process, priority may be determined according to Case 2, and in different CSI processes, priority may be determined according to Case 5.

Figure 10:
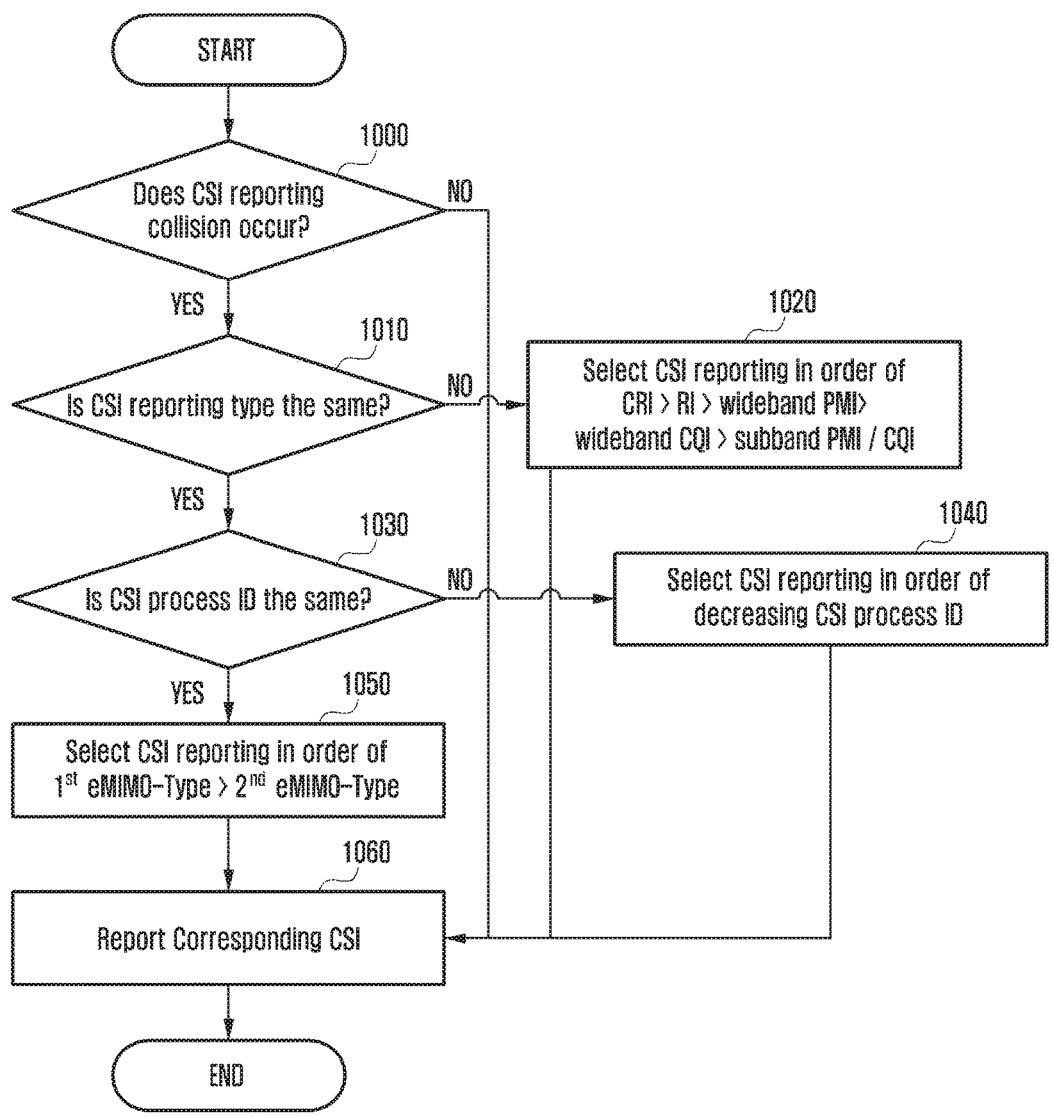
FIG. 10 is a block diagram illustrating a CSI reporting determination procedure in a case where the priority according to the CSI reporting type is higher than the priority according to the eMIMO-type, among the above examples according to an embodiment of the present disclosure.

FIG. 10 is a block diagram illustrating a CSI reporting method of a terminal in a case where the priority according to the CSI reporting type is higher than the priority according to the eMIMO-type according to an embodiment of the present disclosure.

Referring to FIG. 10, in operation 1000, the terminal first determines whether a CSI reporting collision occurs in the corresponding CSI reporting instance. If the CSI reporting collision occurs, in operation 1010, the terminal first determines whether each CSI reporting type is the same, and if the CSI reporting type is different, in operation 1020, the terminal selects the CSI reporting to be reported in the corresponding reporting instance in order of CRI>RI>wideband PMI>wideband CQI>subband PMI/CQI. If the reporting type is the same, in operation 1030, the terminal compares the CSI process ID values among each reporting and reports the CSI based on the lower CSI process ID in operation 1060.

If the CSI process IDs of the two CSI reportings are the same, this means that there is a plurality of CSI reportings in one CSI process. This means that a number of CSI reportings, for example, the CSI reportings for a first eMIMO-Type and a second eMIMO-Type are included in one CSI process. In this case, in operation 1050, the terminal reports the CSI for the first eMIMO-Type in consideration of the fact that the CSI reporting for the first eMIMO-Type includes the previous information of the CSI reporting based on the second eMIMO-Type and drops the CSI for the second eMIMO-Type or compresses and transmits the CSI to be reported in operation 1060. If the CSI process IDs of the two CSI reportings are not the same in operation 1030, then CSI reporting is selected in an order of decreasing CSI process ID in operation 1040.

Figure 11:
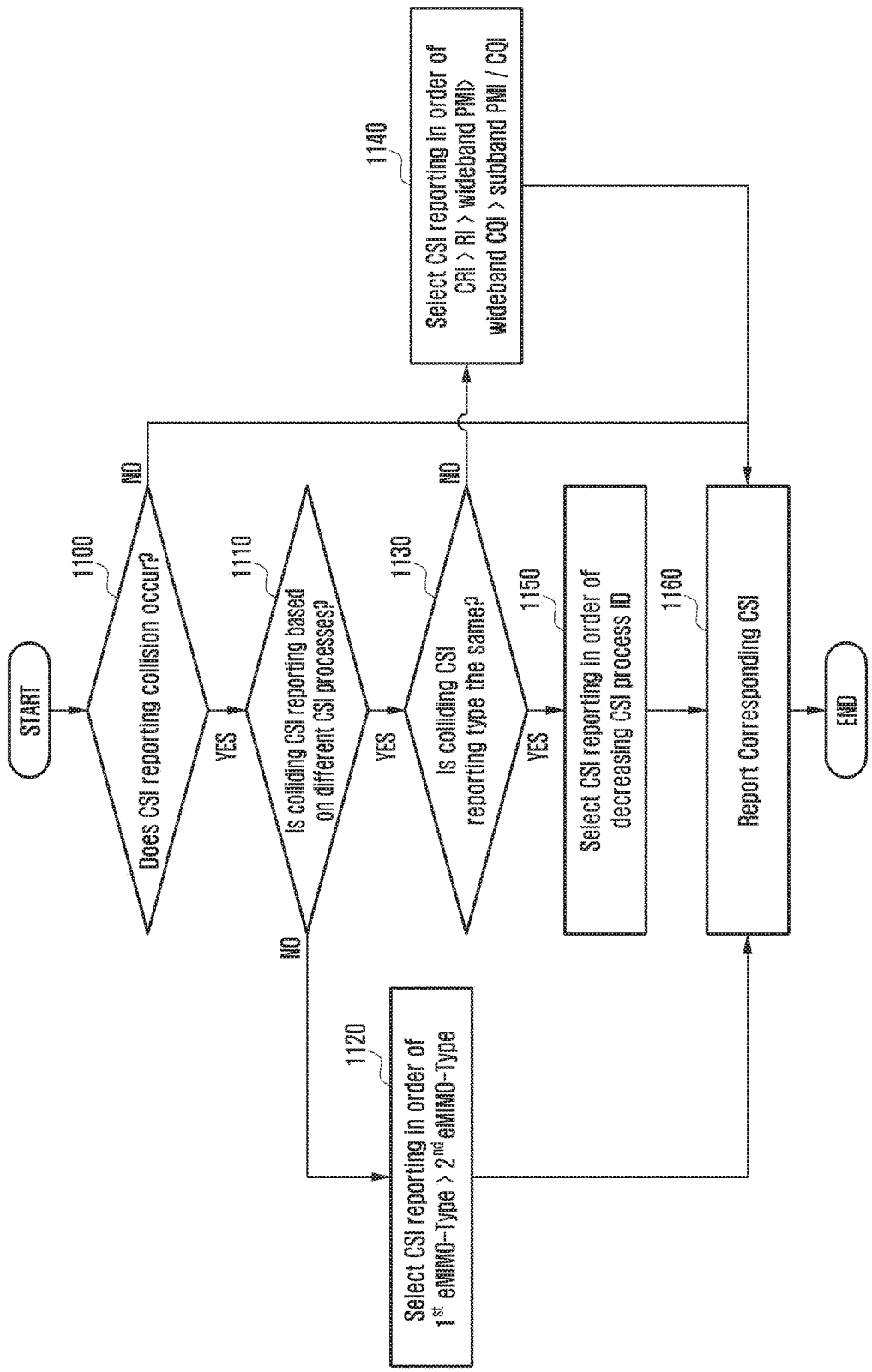
FIG. 11 is a block diagram illustrating a CSI reporting determination procedure in a case where the priority according to the eMIMO-type is higher than the priority according to the CSI reporting type, among the above examples according to an embodiment of the present disclosure.

FIG. 11 is a block diagram illustrating a CSI reporting method of a terminal in a case where the priority according to the eMIMO-type is higher than the priority according to the CSI reporting type according to an embodiment of the present disclosure.

Referring to FIG. 11, in operation 1100, the terminal first determines whether a CSI reporting collision occurs in the corresponding CSI reporting instance. If the CSI reporting collision occurs, in operation 1110, the terminal estimates whether the colliding CSI reporting is based on the same CSI process or on different CSI processes (which may be determined by the CSI process IDs of each CSI reporting). If the colliding CSI reporting is due to the same CSI process, it may be understood that one CSI process includes a plurality of eMIMO-Type configurations. In this case, it is possible to promise that the information on the first eMIMO-Type will take precedence over the information on the second eMIMO-Type regardless of the CSI reporting type like operation 1120. The terminal transmits the CSI in operation 1160 according to the priority.

If the colliding CSI reporting is based on different CSI processes, the terminal may perform the same operation as in the legacy Release 13 in the subsequent procedure. For example, in operation 1130, the terminal first determines whether each CSI reporting type is the same. If the CSI reporting type is different, in operation 1140, the terminal selects the CSI reporting to be reported in the corresponding reporting instance in order of CRI>RI>wideband PMI>wideband CQI>subband PMI/CQI. If the reporting type is the same, in operation 1150, the terminal compares the CSI process ID values among each CSI reporting and reports the CSI based on the lower CSI process ID in operation 1160.

Like operation 1120, if the CSI process IDs of the two CSI reportings are the same, this means that there is a plurality of CSI reports in one CSI process. This means that a plurality of CSI reportings, for example, the CSI reportings for a first eMIMO-Type and a second eMIMO-Type are included in one CSI process. In this case, the terminal reports the CSI for the first eMIMO-Type in consideration of the fact that the CSI reporting for the first eMIMO-Type includes the previous information of the CSI reporting based on the second eMIMO-Type and drops the CSI for the second eMIMO-Type or compresses the CSI to be reported and transmits the compressed CSI to the BS.

Unlike the example of FIG. 10, the feature in FIG. 11 is that the priority for the CSI reporting of the first eMIMO-Type may be set high regardless of the kind of the CSI reporting type.

Figure 12:
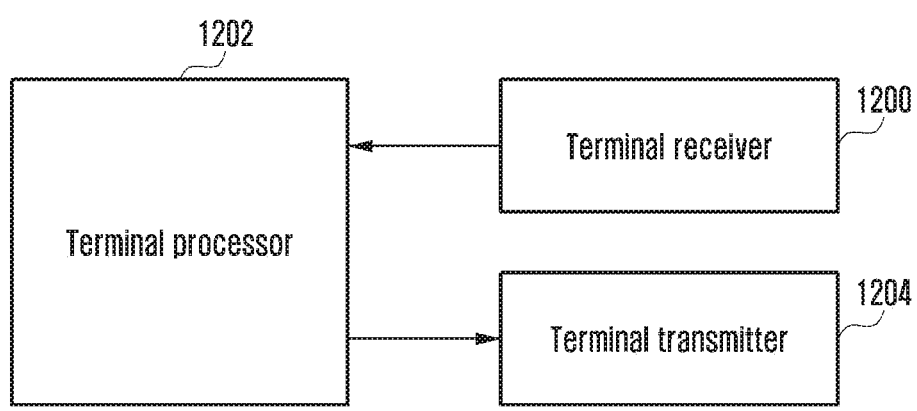
FIG. 12 is a block diagram illustrating an internal structure of a terminal according to an embodiment of the present disclosure.
Figure 13:
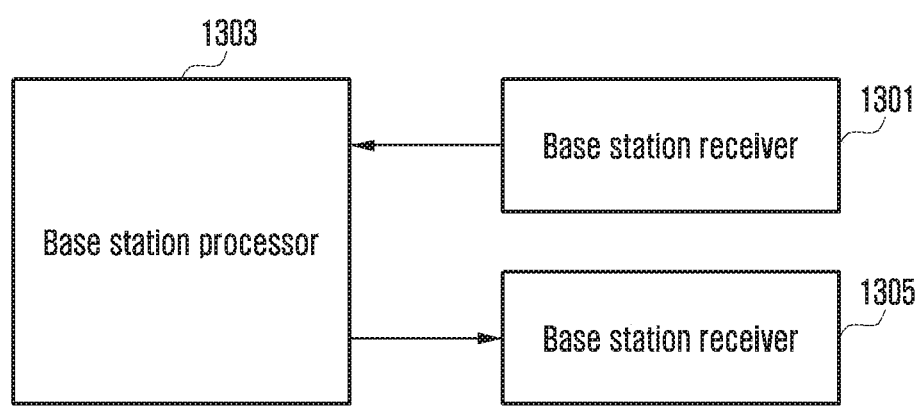
FIG. 13 is a block diagram illustrating an internal structure of a BS according to an embodiment of the present disclosure.

In order to perform the above-described various embodiments of the present disclosure, the transmitter, the receiver, and the processor of the terminal and the BS were illustrated in FIGS. 12 and 13, respectively. FIGS. 12 and 13 illustrate the determination on whether the CSI collision occurs according to the above various embodiments and the transmission/reception method of the BS and the terminal based on the determination. In order to perform this, the receiver, the processor, and the transmitter of the BS and the terminal should each be operated according to an embodiment. This will be described in detail.

FIG. 12 is a block diagram illustrating an internal structure of a terminal according to an embodiment of the present disclosure.

Referring to FIG. 12, the terminal of the present disclosure may include a terminal receiver 1200, a terminal transmitter 1204, and a terminal processor 1202. The terminal receiver 1200 and the terminal transmitter 1204 may be collectively referred to as a transceiver in the embodiment of the present disclosure. The transceiver may transmit and receive signals to and from the BS. The signal may include control information and data. To this end, the transceiver may include a radio frequency (RF) transmitter for up-converting and amplifying the frequency of the transmitted signal, an RF receiver for low-noise amplifying the received signal and down-converting the frequency, or the like. In addition, the transceiver may receive a signal through a wireless channel and output the signal to the terminal processor 1202, and transmit the signal output from the terminal processor 1202 through the wireless channel.

The terminal processor 1202 may control a series of processes so that the terminal can operate according to an embodiment of the present disclosure described above. For example, the terminal receiver 1200 may receive the configuration information for each CSI reporting from the BS, and the terminal processor 1202 may control to analyze the priority according to the CSI reporting according to the setting. Then, the terminal transmitter 1204 performs appropriate CSI reporting according to the priority at the above timing.

FIG. 13 is a block diagram illustrating an internal structure of a BS according to an embodiment of the present disclosure.

Referring to FIG. 13, the BS of the present disclosure may include a BS receiver 1301, a BS transmitter 1305, and a BS processor 1303. The BS receiver 1301 and the BS transmitter 1305 may be collectively referred to as a transceiver in the embodiment of the present disclosure. The transceiver may transmit and receive signals to and from the terminal. The signal may include control information and data. To this end, the transceiver may include an RF transmitter for up-converting and amplifying the frequency of the transmitted signal, an RF receiver for low-noise amplifying the received signal and down-converting the frequency, or the like. In addition, the transceiver may receive a signal through a wireless channel and output the signal to the BS processor 1303, and transmit the signal output from the BS processor 1303 through the wireless channel.

The BS processor 1303 may control a series of processes so that the BS can operate according to the embodiment of the present disclosure described above. The BS processor 1303 may control the BS transmitter 1305 to generate the configuration information for each CSI reporting to the terminal and transmit the information. In addition, the BS processor 1303 may control the BS transmitter 1305 to transmit CSI-RS. In addition, the BS processor 1303 may control the BS receiver 1301 to receive the CSI transmitted from the terminal according to the priority of the CSI according to the setting.

Meanwhile, the various embodiments of the present disclosure disclosed in the present specification and the accompanying drawings have been provided only as specific examples in order to assist in understanding the present disclosure and do not limit the scope of the present disclosure. That is, it is obvious to those skilled in the art to which the present disclosure pertains that other change examples based on the technical idea of the present disclosure may be made without departing from the scope of the present disclosure. Further, each embodiment may be combined and operated as needed. For example, parts of the first embodiment and the second embodiment of the present disclosure are combined with each other to operate the BS and the terminal. Further, although the above various embodiments are presented on the basis of the FDD LTE system, other modifications based on the technical idea of the embodiment can be implemented in other systems such as the TDD LTE system, the 5G or the NR system.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a terminal in a wireless communication system, the method comprising:
   receiving feedback configuration information on a periodic channel state information (CSI) reporting of at least one CSI process;
   identifying whether two overlapped CSI reportings are associated with a CSI process based on the feedback configuration information;
   identifying a CSI reporting to be reported to a base station (BS) based on multiple input multiple output (MIMO) types of the two CSI reportings in case of the two overlapped CSI reportings being associated with the CSI process; and
   transmitting CSI of the identified CSI reporting to the BS,
   wherein, in case that a first CSI reporting is associated with a first MIMO type of the CSI process configured as class A or class B with cell-specific beamformed channel state information reference signal (CSI-RS) and a second CSI reporting is associated with a second MIMO type of the CSI process configured as class B with terminal-specific beamformed CSI-RS, the first CSI reporting is identified to be reported.

2. The method of claim 1, further comprising:
   generating the CSI by combining CSI for the first CSI reporting of the first MIMO type and CSI for the second CSI reporting of the second MIMO type of the CSI process.

3. The method of claim 1, further comprising:
   identifying a CSI reporting to be reported to the BS based on information types of the two CSI reportings in case that the two CSI reportings are associated with different CSI processes respectively.

4. The method of claim 3, wherein in case that the two reportings are associated with same information type, a CSI reporting associated with lower CSI process identifier (ID) is identified to be reported.

5. The method of claim 3, wherein a priority of a precoding matrix indicator (PMI) associated with the first MIMO type of the CSI process is higher than priorities associated with a second MIMO type of configured CSI processes.

6. The method of claim 1, wherein a priority of a precoding matrix indicator (PMI) associated with the first MIMO type of the CSI process is higher than priorities associated with the second MIMO type of the CSI process.

7. The method of claim 1, wherein a priority of a PMI associated with the first MIMO type of the CSI process is higher than priorities associated with the second MIMO type of the CSI process except a priority of a rank indicator (RI) associated with the second MIMO type of the CSI process.

8. A method of a base station (BS) in a wireless communication system, the method comprising:
   transmitting feedback configuration information on a periodic channel state information (CSI) reporting of at least one CSI process;
   identifying whether two overlapped CSI reportings are associated with a CSI process based on the feedback configuration information;
   identifying a CSI reporting to be reported to a BS based on multiple input multiple output (MIMO) types of the two CSI reportings in case of the two overlapped CSI reportings being associated with the CSI process; and
   receiving CSI of the identified CSI reporting to the BS,
   wherein, in case that a first CSI reporting is associated with a first MIMO type of the CSI process configured as class A or class B with cell-specific beamformed channel state information reference signal (CSI-RS) and a second CSI reporting is associated with a second MIMO type of the CSI process configured as class B with terminal-specific beamformed CSI-RS, the first CSI reporting is identified to be reported.

9. The method of claim 8, wherein a priority of a precoding matrix indicator (PMI) associated with the first MIMO type of the CSI process is higher than priorities associated with a second MIMO type of configured CSI process.

10. A terminal in a wireless communication system, the terminal comprising:
    a transceiver; and
    a controller coupled with the transceiver and configured to control to:
        receive feedback configuration information on a periodic channel state information (CSI) reporting of at least one CSI process,
        identify whether two overlapped CSI reportings are associated with a CSI process based on the feedback configuration information,
        identify a CSI reporting to be reported to a base station (BS) based on multiple input multiple output (MIMO) types of the two CSI reportings in case of the two overlapped CSI reportings being associated with the CSI process, and
        transmit CSI of the identified CSI reporting to the BS,
    wherein, in case that a first CSI reporting is associated with a first MIMO type of the CSI process configured as class A or class B with cell-specific beamformed channel state information reference signal (CSI-RS) and a second CSI retorting is associated with a second MIMO type of the CSI process configured as class B with terminal-specific beamformed CSI-RS, the first CSI reporting is identified to be reported.

11. The terminal of claim 10, wherein the controller is further configured to
    generate the CSI by combining CSI for the first CSI reporting of the first MIMO type and CSI for the second CSI reporting of the second MIMO type of the CSI process.

12. The terminal of claim 10, wherein the controller is further configured to identify a CSI reporting to be reported to the BS based on information types of the two CSI reportings in case that the two CSI reportings are associated with different CSI processes respectively.

13. The terminal of claim 12, wherein in case that the two reportings are associated with same information type, a CSI reporting associated with lower CSI process identifier (ID) is identified to be reported.

14. The terminal of claim 12, wherein a priority of a precoding matrix indicator (PMI) associated with the first MIMO type of the CSI process is higher than priorities associated with a second MIMO type of configured CSI processes.

15. The terminal of claim 10, wherein a priority of a precoding matrix indicator (PMI) associated with the first MIMO type of the CSI process is higher than priorities associated with the second MIMO type of the CSI process.

16. The terminal of claim 10, wherein a priority of a PMI associated with the first MIMO type of the CSI process is higher than priorities associated with the second MIMO type of the CSI process except a priority of a rank indicator (RI) associated with the second MIMO type of the CSI process.

17. A base station (BS) in a wireless communication system, the BS comprising:
a transceiver; and
a controller coupled with the transceiver and configured to control to:
transmit feedback configuration information on a periodic channel state information (CSI) reporting of at least one CSI process,
identify whether two overlapped CSI reportings are associated with a CSI process based on the feedback configuration information;
identify a CSI reporting to be reported to a BS based on multiple input multiple output (MIMO) types of the two CSI reportings in case of the two overlapped CSI reportings being associated with the CSI process; and
receive CSI of the identified CSI reporting to the BS,
wherein, in case that a first CSI reporting is associated with a first MIMO type of the CSI process configured as class A or class B with cell-specific beamformed channel state information reference signal (CSI-RS) and a second CSI retorting is associated with a second MIMO type of the CSI process configured as class B with terminal-specific beamformed CSI-RS, the first CSI reporting is identified to be reported.

18. The BS of claim 17, wherein a priority of a precoding matrix indicator (PMI) associated with the first MIMO type of the CSI process is higher than priorities associated with a second MIMO type of configured CSI processes.

* * * * *